(12) United States Patent
Shimono

(10) Patent No.: US 6,593,922 B1
(45) Date of Patent: Jul. 15, 2003

(54) COMPUTER READABLE RECORDING MEDIUM HAVING PROGRAMS FOR THREE-DIMENSIONAL COMPUTER IMAGE PROCESSING STORED THEREON, GRADUATION RENDERING PROCESSING METHOD, AND VIDEO GAME DEVICE

(75) Inventor: Toshinori Shimono, Tokyo (JP)

(73) Assignee: Square Co., Ltd., Tokyo (JP)

( * ) Notice: Subject to any disclaimer, the term of this patent is extended or adjusted under 35 U.S.C. 154(b) by 0 days.

(21) Appl. No.: 09/538,279

(22) Filed: Mar. 30, 2000

(30) Foreign Application Priority Data

Dec. 31, 1999  (JP) .............................. 11-377235
Feb. 25, 2000  (JP) ....................... 2000-050092

(51) Int. Cl.$^7$ ............................................. G06T 17/00
(52) U.S. Cl. ...................................................... 345/419
(58) Field of Search ................. 345/429, 418, 345/419, 423, 426, 430

(56) References Cited

U.S. PATENT DOCUMENTS 5,995,111 A * 11/1999 Morioka et al. ............ 345/429
6,078,332 A * 6/2000 Ohazama .................... 345/426

FOREIGN PATENT DOCUMENTS

| JP | 6-139353 | 5/1994 |
| JP | 7-104733 | 4/1995 |
| JP | 8-185543 | 7/1996 |
| JP | 9-198523 | 7/1997 |
| JP | 10222694 | 8/1998 |
| JP | 11-42370 | 2/1999 |
| JP | 11120377 | 4/1999 |
| JP | 00-093654 | 4/2000 |
| JP | 20-93654 | 4/2000 |

OTHER PUBLICATIONS

English Language abstract of JP-06-139353.
English Language abstract of JP-07-104733.
English Language abstract of JP-08-185543.
English Language abstract of JP-09-198523.
English Language abstract of JP-11-042370
English Language abstract of JP-2000-093654.
An English Language abstract of JP 11-120377.

* cited by examiner

Primary Examiner—Cliff N. Vo
(74) Attorney, Agent, or Firm—Greenblum & Bernstein, P.L.C.

(57) ABSTRACT

Graduation rendering processing brings about an effective defocused image of multi-levels of halftone according to the depth of the virtual three-dimensional space without requiring complicated operation processing. Subtraction processing is carried out in which the luminosity of an original image of the frame buffer to be displayed on a screen is reduced by a greater luminosity in the images located at the back than at the front in the depth of the virtual three-dimensional space. Then, addition processing is carried out in which images having a luminosity corresponding to the reduced value of luminosity in the subtraction processing are distributed and added around the original image of the frame buffer with the positions of the images shifted with respect to the original image. The image of the frame buffer, which has been subjected to the subtraction processing and addition processing, is displayed on the screen.

16 Claims, 11 Drawing Sheets

FIG. 7A
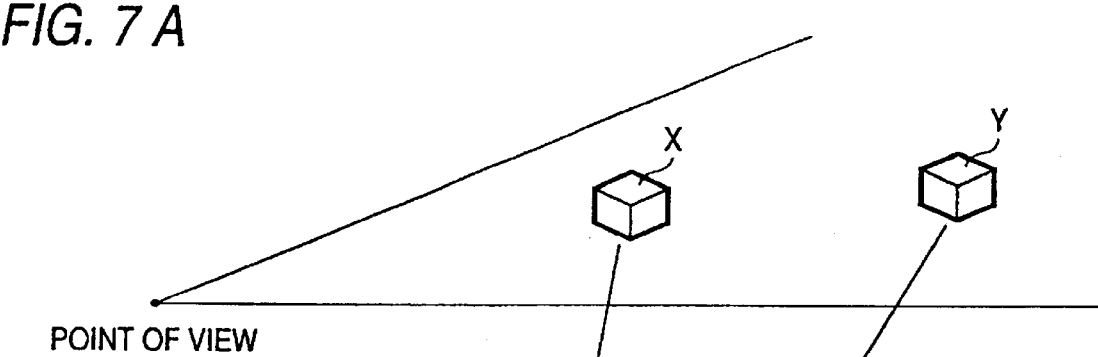
POINT OF VIEW
FIG. 7B
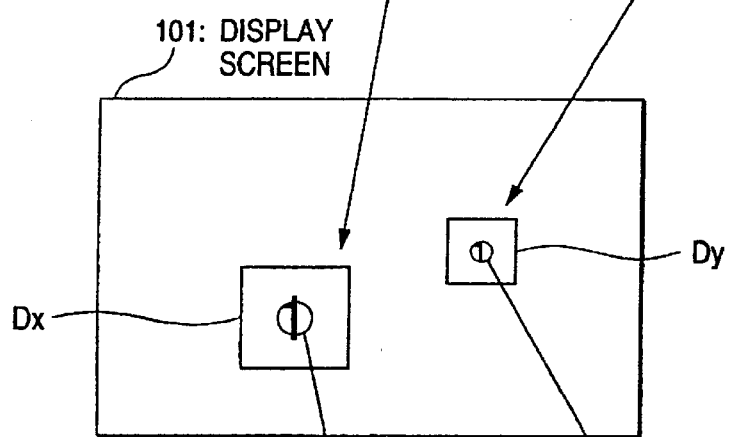
101: DISPLAY SCREEN
Dx
Dy
FIG. 7C 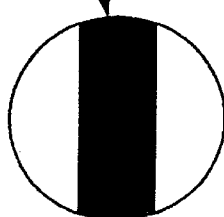 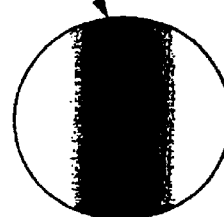 FIG. 7D

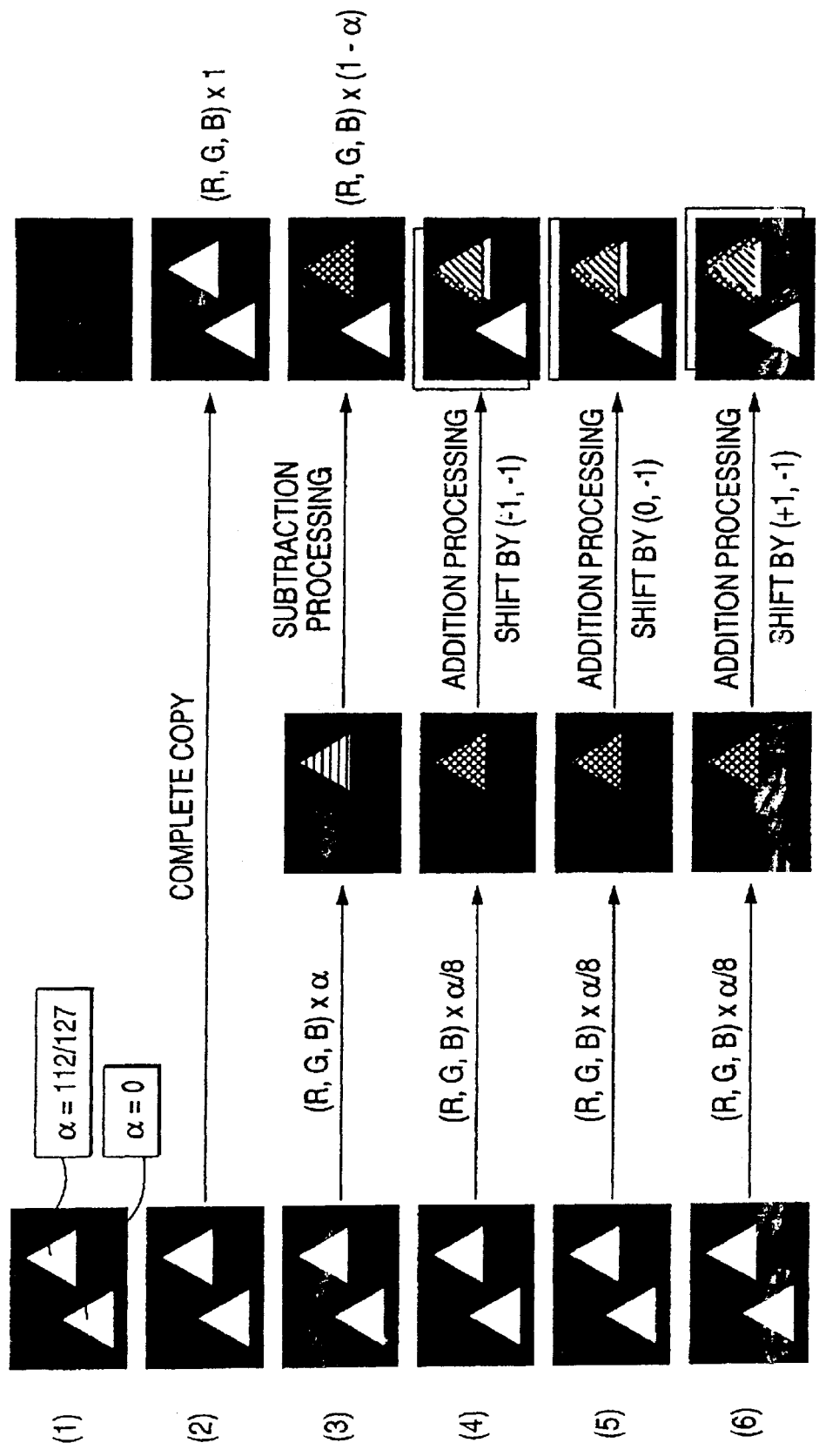

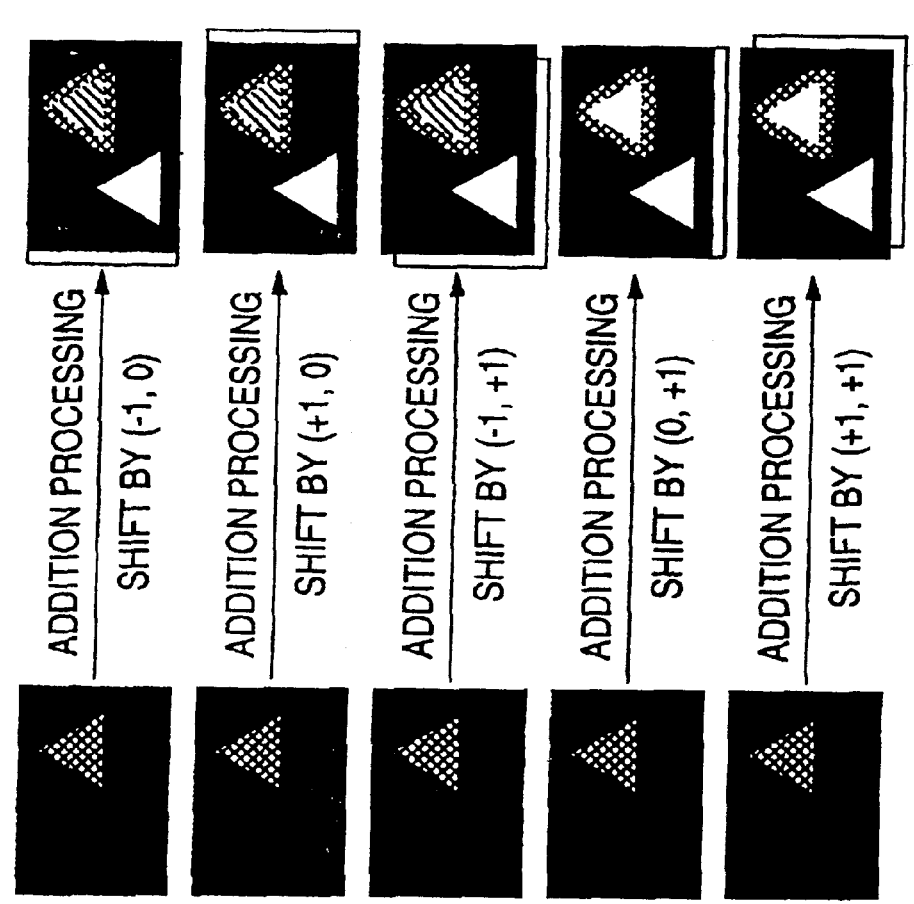

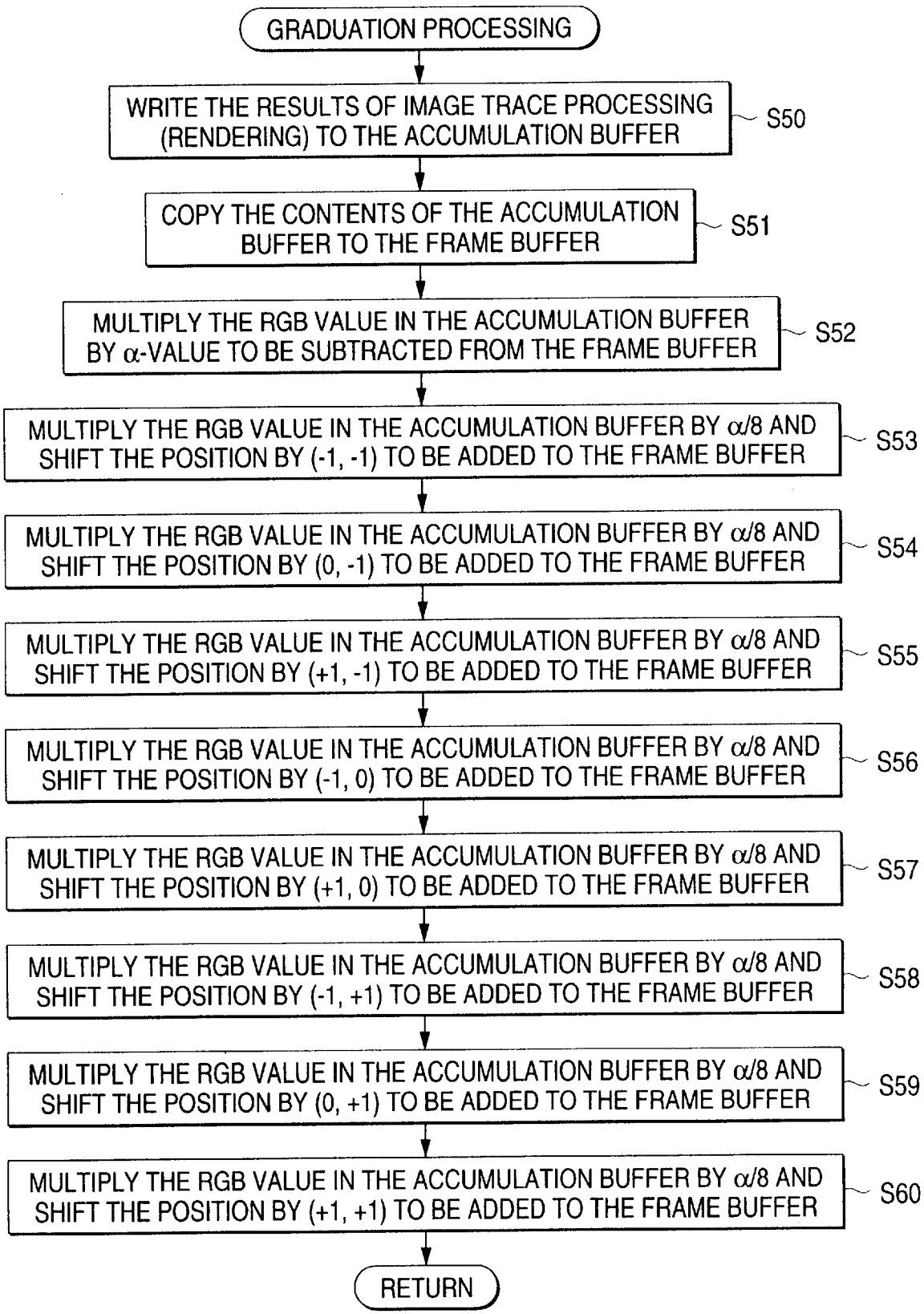

COMPUTER READABLE RECORDING MEDIUM HAVING PROGRAMS FOR THREE-DIMENSIONAL COMPUTER IMAGE PROCESSING STORED THEREON, GRADUATION RENDERING PROCESSING METHOD, AND VIDEO GAME DEVICE

BACKGROUND OF THE INVENTION

1. Field of the Invention

The present invention relates to a computer readable recording medium in which, for example, programs for three-dimensional computer image processing are stored, a graduation rendering processing method, and a video game device.

2. Description of the Related Art

It has been suggested to carry out image processing for rendering defocused images in image processing of three-dimensional computer images that are used in a video game or the like. The defocused images can be obtained by providing an image rendered in a virtual three-dimensional space of a monitor screen with a graduation effect according to the depth of field and the like. A technique for giving the graduation effect according to the depth of field and the like is disclosed, for example, in Japanese Laid-Open Patent Nos. 139353/1994 and 222694/1998.

Japanese Laid-Open Patent No. 139353/1994 discloses an image processing technique for obtaining a defocused image by carrying out predetermined addition to and subtraction from a predetermined number of image data of adjacent pixels in accordance with input image data by means of a hardware configuration comprising flip-flop circuits.

In Japanese Laid-Open Patent No. 222694/1998, there is provided a graduation value buffer for storing information regarding the level of influence, which image data of each pixel of a frame buffer gives to the surrounding, as graduation values by the predetermined number of pixels. Moreover, a graduation image is generated by carrying out graduation filtering operation processing for image data of each pixel, which are read from the frame buffer, in accordance with the level of influence of the surrounding pixels read from the graduation value buffer. This technique is suitable, for example, for the generation of graduation images to obtain after-images of a moving image according to the traveling speed thereof.

The image processing technique shown in Japanese Laid-Open Patent No. 139353/1994 obtains defocused images by means of a hardware configuration comprising flip-flop circuits or the like. Accordingly, with this image processing technique, the addition and subtraction processing is in practice limited to pixels adjacent in the direction of principal scan, and it is difficult to obtain effective defocused images of multi-levels of halftone according to the depth of the virtual three-dimensional space.

The object of the present invention is to provide a computer readable recording medium in which programs for three-dimensional computer image processing are stored, a graduation rendering processing method, and a video game device, which obtains effective defocused (out-of-focus) images of multi-levels of halftone according to the depth of the virtual three-dimensional space without the necessity of complicated operation processing.

SUMMARY OF THE INVENTION

According to a first aspect of the present invention, a computer readable recording medium is characterized by having programs recorded thereon for allowing a computer to: set luminosity to a first three-dimensional image, that is, an original image so as to be greater in luminosity frontward in a depth of a virtual three-dimensional space and acquire a second three-dimensional image based on the first three-dimensional image with a luminosity which has been set. The computer also sets luminosity to the first three-dimensional image so as to be greater in luminosity backward in the depth of the virtual three-dimensional space and acquire a third three-dimensional image based on the first three-dimensional image with a luminosity which has been set. The computer also superimposes the second three-dimensional image on the third three-dimensional image with a positional relationship in which a center position of the third three-dimensional image having the luminosity which has been set is different from a center position of the second three-dimensional image, and displays the superimposed three-dimensional image.

In the first aspect of the present invention, the computer readable recording medium is characterized in that, in a case of superimposing the second three-dimensional image on the third three-dimensional image, the second three-dimensional image is superimposed on the third three-dimensional image with a positional relationship in which the third three-dimensional image is shifted by the unit of a pixel with respect to the second three-dimensional image.

In the first aspect of the present invention, the computer readable recording medium is characterized in that, in a case of superimposing the second three-dimensional image on the third three-dimensional image, the second three-dimensional image is superimposed on the third three-dimensional image with a positional relationship in which each of the third three-dimensional images is shifted by the unit of a pixel in n (n is a natural number) directions around the second three-dimensional image.

According to a second aspect of the present invention, a computer readable recording medium which is a recording medium is characterized by having programs recorded thereon for allowing a computer to: set luminosity to a first three-dimensional image, that is, an original image so as to be greater in luminosity backward in a depth of a virtual three-dimensional space and acquire a dummy three-dimensional image based on the first three-dimensional image with a luminosity which has been set; to superimpose the first three-dimensional image on the dummy three-dimensional image with a positional relationship in which a center position of the dummy three-dimensional image having the luminosity which has been set is different from a center position of the first three-dimensional image, and; to display the superimposed three-dimensional image.

In a third aspect of the present invention, a computer readable recording medium on which is recorded a three-dimensional computer image processing program for displaying an image on a virtual three-dimensional space of a monitor screen is characterized by having a program recorded thereon for allowing a computer to: carry out subtraction processing for reducing a luminosity of an original image of a frame buffer for screen display by a larger luminosity in an image located rearward in a depth of the virtual three-dimensional space. The computer also carries out addition processing for distributing and adding an image having a luminosity corresponding to a reduced value of luminosity in the subtraction processing around the original image of the frame buffer, with a position of the image shifted with respect to the original image. The computer also displays the image, which has been subjected to the subtraction processing and the addition processing, of the frame buffer on the screen.

In the third aspect of the present invention, the computer readable recording medium is characterized in that, in the addition processing, the image is displaced by the unit of a pixel in n directions (n is a natural number) to be distributed and added at n positions around the original image. Each of displaced images is provided with a 1/n luminosity corresponding to the reduced value of luminosity.

In the first to third aspects of the present invention, the computer readable recording medium is characterized in that, the depth of the virtual three-dimensional space is a distance in the direction of a visual axis between an imaginary plane, passing through a viewpoint and perpendicular to the visual axis, and the first three-dimensional image, that is, the original image.

According to a fourth aspect of the present invention, a graduation rendering processing method in three-dimensional computer image processing includes: setting luminosity to a first three-dimensional image, that is, an original image so as to be greater in luminosity frontward in a depth of a virtual three-dimensional space and acquiring a second three-dimensional image based on the first three-dimensional image with a luminosity which has been set. The computer also sets luminosity to the first three-dimensional image so as to be greater in luminosity backward in the depth of the virtual three-dimensional space and acquire a third three-dimensional image based on the first three-dimensional image with a luminosity which has been set. The computer also superimposes the second three-dimensional image on the third three-dimensional image with a positional relationship in which a center position of the third three-dimensional image having the luminosity which has been set is different from a center position of the second three-dimensional image, and displays the superimposed three-dimensional image.

In the fourth aspect of the present invention, the graduation rendering processing method in three-dimensional computer image processing is characterized in that, in a case of superimposing the second three-dimensional image on the third three-dimensional image, the second three-dimensional image is superimposed on the third three-dimensional image with a positional relationship in which the third three-dimensional image is shifted by the unit of a pixel with respect to the second three-dimensional image.

In the fourth aspect of the present invention, the graduation rendering processing method in three-dimensional computer image processing is characterized in that, in a case of superimposing the second three-dimensional image on the third three-dimensional image, the second three-dimensional image is superimposed on the third three-dimensional image with a positional relationship in which each of the third three-dimensional images is shifted by the unit of a pixel in n (n is a natural number) directions around the second three-dimensional image.

According to a fifth aspect of the present invention, a graduation rendering processing method in three-dimensional computer image processing includes: setting luminosity to a first three-dimensional image, that is, an original image so as to be greater in luminosity backward in a depth of a virtual three-dimensional space and acquiring a dummy three-dimensional image based on the first three-dimensional image with a luminosity which has been set. The method also includes superimposing the first three-dimensional image on the dummy three-dimensional image with a positional relationship in which a center position of the dummy three-dimensional image having the luminosity which has been set is different from a center position of the first three-dimensional image. The method further includes displaying the superimposed three-dimensional image.

According to a sixth aspect of the present invention, a graduation rendering processing method in three-dimensional computer image processing includes: carrying out subtraction processing for reducing a luminosity of an original image of a frame buffer for screen display by a larger luminosity in an image located rearward in a depth of the virtual three-dimensional space, and carrying out addition processing for distributing and adding an image having a luminosity corresponding to a reduced value of luminosity in the subtraction processing around the original image of the frame buffer, with a position of the image shifted with respect to the original image. The method also includes displaying the image, which has been subjected to the subtraction processing and the addition processing, of the frame buffer on the screen.

In the sixth aspect of the present invention, the graduation rendering processing method in three-dimensional computer image processing is characterized in that, in the addition processing, the image is displaced by the unit of a pixel in n directions (n is a natural number) to be distributed and added at n positions around the original image, and each displaced image is provided with a 1/n luminosity corresponding to the reduced value of luminosity.

In the first to sixth aspects of the present invention, the graduation rendering processing method in three-dimensional computer image processing is characterized in that the depth of the virtual three-dimensional space is a distance in the direction of a visual axis between an imaginary plane, passing through a viewpoint and perpendicular to the visual axis, and the first three-dimensional image, that is, the original image.

According to a seventh aspect of the present invention, a video game device for displaying backgrounds or game character images in a virtual three-dimensional space of a monitor screen includes a frame buffer for screen display. The device also includes a subtraction processor for reducing a luminosity of an original image of a frame buffer for screen display by a larger luminosity in an image located rearward in a depth of the virtual three-dimensional space. The device includes an addition processor for distributing and adding an image having a luminosity corresponding to a reduced value of luminosity in the subtraction processing around the original image of the frame buffer, with a position of the image shifted with respect to the original image. The device also includes a display that displays the image, which has been subjected to the subtraction processing and the addition processing, of the frame buffer on the screen.

According to an eighth aspect of the present invention, a video game device for displaying backgrounds or game character images in a virtual three-dimensional space of a monitor screen includes a second image acquiring system that sets luminosity to a first three-dimensional image, that is, an original image so as to be greater in luminosity frontward in a depth of a virtual three-dimensional space and acquires a second three-dimensional image based on the first three-dimensional image with a luminosity which has been set. The device also includes a third image acquiring system that sets luminosity to the first three-dimensional image so as to be greater in luminosity backward in the depth of the virtual three-dimensional space and acquires a third three-dimensional image based on the first three-dimensional image with a luminosity which has been set.

The device includes a superimposing system that superimposes the second three-dimensional image on the third three-dimensional image with a positional relationship in which a center position of the third three-dimensional image having the luminosity which has been set is different from a center position of the second three-dimensional image. The device also includes a display that displays the superimposed three-dimensional image.

BRIEF DESCRIPTION OF THE DRAWINGS

FIG. 7(a) shows an example of arrangement of objects in the virtual three-dimensional space;

FIG. 7(b) shows the display screen of the virtual three-dimensional space; and

FIGS. 7(c) and (d) are explanatory views showing the detailed (partially enlarged) display screen;

FIGS. 10(a)–10(c) are first schematic explanatory views showing the procedure of graduation rendering processing, according to a second embodiment;

FIGS. 11(a)–11(c) are second schematic explanatory views showing the procedure of graduation rendering processing, according to a second embodiment; and FIG. 12 is a flow diagram showing a graduation processing flow employing a video game device, a computer readable recording medium, and a graduation rendering processing method, according to a second embodiment of the present invention.

DESCRIPTION OF THE PREFERRED EMBODIMENTS

The embodiments of the present invention are explained below in detail with reference to the accompanying drawings.

[First Embodiment]

Figure 1:
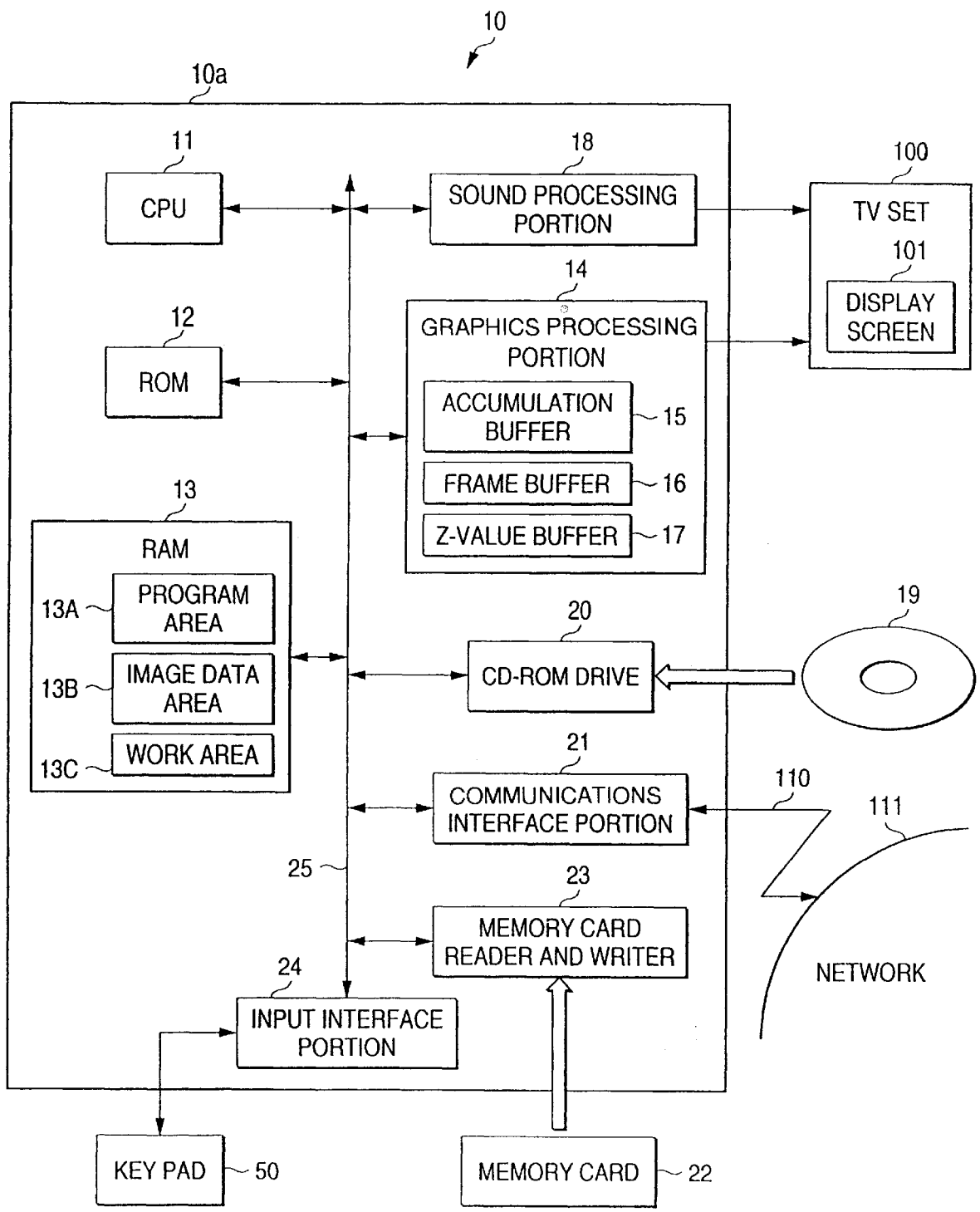
FIG. 1 is a block diagram showing an embodiment of a video game device, according to an aspect of the present invention.

FIG. 1 shows a video game device according to the present invention. This video game device executes programs recorded on a computer readable recording medium according to the present invention and is used for implementing a graduation rendering processing method according to the present invention.

A video game device 10 comprises a game machine main body 10a, and a key pad 50 that is connected to the input side of the game machine main body 10a. Moreover, the video game device 10 has a TV set 100, which comprises a CRT or the like as a monitor with a loud speaker, connected to the output side of the game machine main body 10a. The key pad 50 is operated by the user (operator) and transmits a control command provided by the user to the game machine main body 10a. The TV set 100 displays video (images) and outputs sound according to the contents of a game, based on the video signal (image signal) and sound signal from the game machine main body 10a.

The game machine main body 10a comprises a CPU 11, a ROM 12, a RAM 13, a graphics processing portion 14, a sound processing portion 18, a CD-ROM drive 20, a communications interface portion 21, a memory card reader/writer 23, an input interface portion 24, and a bus 25.

The CPU 11 carries out game programs that are stored in a program area 13A of the RAM 13, which is described later. Recorded in the ROM 12 is a program in which processing or the like required for loading programs from a CD-ROM 19 at the time of turning the power ON.

Defined in the RAM 13 are a program area 13A for storing game programs, an image data area 13B for storing image data such as backgrounds and game characters, which are required in the course of execution of programs, and a work area 13C for storing various data generated in the course of execution of programs. Thus, the RAM 13 stores, in each of the areas, the game programs and image data, which the CD-ROM drive 20 reads from the CD-ROM 19. A program for three-dimensional computer image processing according to the present invention is included in a game program that the CD-ROM 19 reads.

The graphics processing portion 14 includes an accumulation buffer 15, a frame buffer 16, and a Z-value buffer 17 or the like. The accumulation buffer 15 and the frame buffer 16 are buffer memories having the same configuration.

Image data of original images (a first three-dimensional image) comprising polygons or the like that are given by the command of the CPU 11 are written in the accumulation buffer 15 as the primary buffer memory in the course of execution of game programs by the CPU 11. The data format of the accumulation buffer 15 will be described later.

The frame buffer 16 is a buffer for writing therein image data to be displayed on a display screen 101. The Z-value buffer 17 is a buffer for storing therein Z-values of image data that are acquired in image rendering processing (rendering). The Z-values to be stored in the Z-value buffer 17 are provided with greater values at the front than at the back when viewed from the viewpoint.

Moreover, the graphics processing portion 14 generates a video signal by the command from the CPU 11 in accordance with the image data stored in the frame buffer 16 and outputs the video signal to the TV set 100. This provides a screen display on the display screen 101 of the TV set 100 by the image data stored in the frame buffer 16.

The sound processing portion 18 generates sound signals such as background music or sound effects in accordance with the command from the CPU 11. The CD-ROM drive 20 reads game programs, image data, sound data or the like, which are stored in the CD-ROM 19 or a recording medium.

The communications interface portion 21 carries out data communications with other device selectively coupled to a network 111 via a telecommunications line 110. The memory card reader/writer 23 reads from and writes to a memory card 22 for saving the save data such as data of an in-progress game or data for setting environments of a game.

The input interface portion 24 receives input signals from the key pad 50 and sends the signals to the CPU via the bus 25. The bus 25 connects each of the components of the game machine main body 10a to one another.

The data format of the accumulation buffer 15 for each pixel is now explained. The data format of the accumulation buffer 15 for each pixel comprises a R value, a G value, a B value, and an α value, each of which has 8 bits. The lower seven bits of the value of the accumulation buffer 15 constitute a parameter value (0–127) showing the depth of the virtual three-dimensional space. Hereinafter, for convenience in writing, the parameter value (0–127) is referred to as the α value having a value between 0 and 1.

A value assigned to the a value shows the depth from the viewpoint of a polygon written in the R, G, and B values. The value of depth assigned to the α value is larger for a polygon at the back of the viewpoint than for one at the front. More specifically, the α value is set linearly in proportion to the distance from an imaginary plane perpendicular to a visual axis (the axis connecting the viewpoint and a point of attention) passing through the viewpoint in the direction of the visual axis to an apex of a polygon (a first three-dimensional image or an original image). This α value is written to the accumulation buffer 15 for each pixel at the time of polygon perspective conversion in addition to the R, G, and B values of each pixel written thereto.

The CPU 11 of the game machine main body 10a in the video game device 10 shown in FIG. 1 executes a game program, thereby executing the graduation rendering processing. In the graduation rendering processing according to the first embodiment, the image data of original images shown in column (1) of FIG. 2(a) are written to the accumulation buffer 15.

Incidentally, (1)–(11) of column (a) (i.e., FIG. 2(a)) show schematically the transition of image data of the accumulation buffer 15 in the graduation rendering processing according to the first embodiment. In addition, (1)–(11) of column (b) (i.e., FIG. 2(b)) show schematically the transition of image data of the accumulation buffer 16 in the graduation rendering processing according to the first embodiment.

Figure 2:
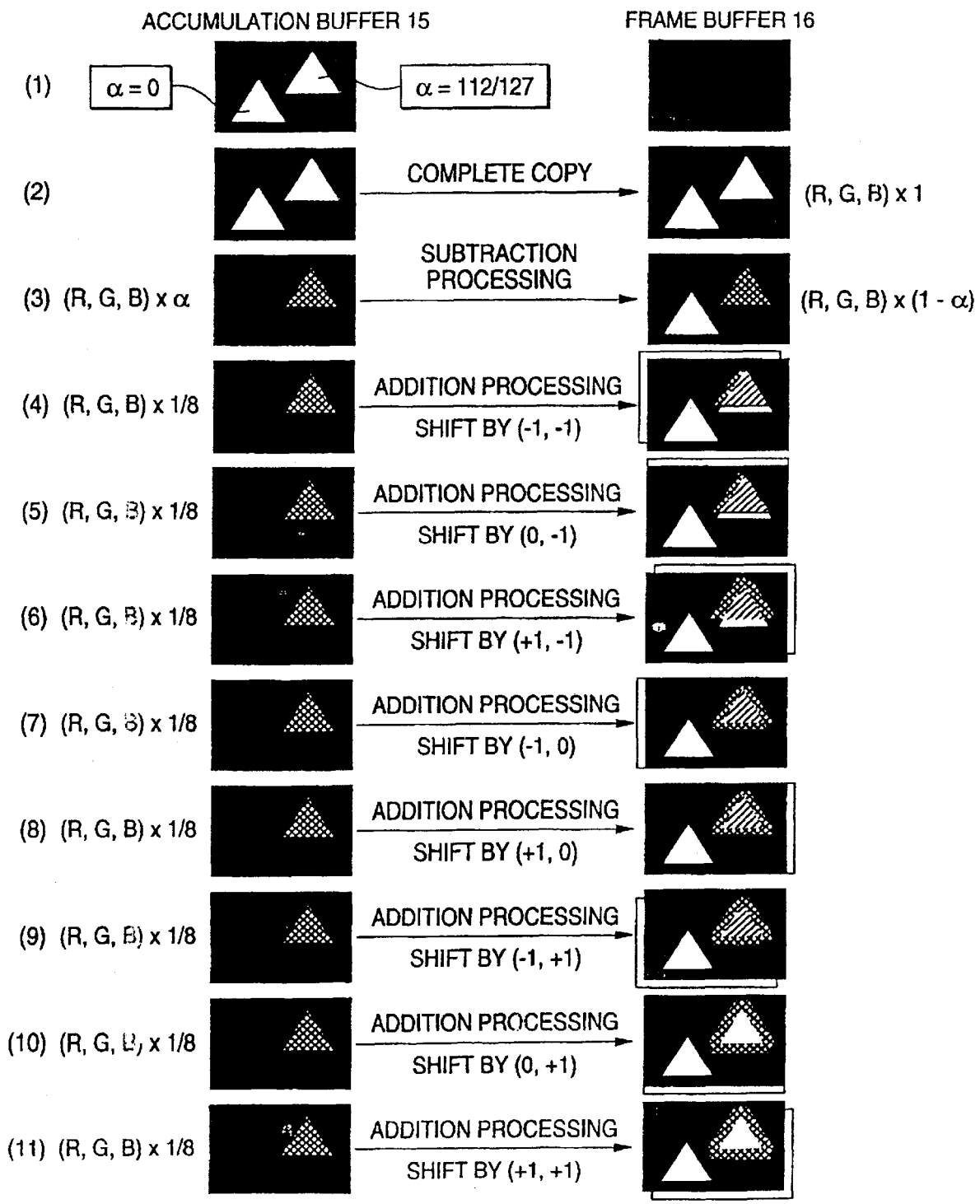
FIGS. 2(a) and 2(b) are schematic explanatory views showing the procedure of graduation rendering processing, according to a first embodiment of the present invention.

As shown in FIG. 2 (2), all of the image data (initial data) of the original images (first three-dimensional images) of the accumulation buffer 15 is copied to the frame buffer 16. Hereinafter, a position in the frame buffer 16 to which an original image is written by copy is defined as the position of the original image. With the position of an original image taken as a reference, a shift is defined in addition processing, which will be described later.

First, as the graduation rendering processing, the CPU 11 multiples a value expressing the luminosity of each pixel of the accumulation buffer 15 by the α value of that pixel (the α value is a real number ranging from 0 to 1). The multiplication by the α value is executed with respect to each of the R, G, and B values of each pixel expressing the luminosity (the R, G, and B values are each a real number ranging from 0 to 1). Further, the CPU 11 updates the luminosity of each pixel of the accumulation buffer 15 with a value after the multiplication by the α value. As a result, the image data of the accumulation buffer 15 becomes image data that provides greater luminosity for an image located at the back than for an image located at the front in the depth of the virtual three-dimensional space, with respect to the original image (refer to (3) in FIG. 2(a)).

In accordance with a first three-dimensional image or an original image, this provides a three-dimensional image that is set to be greater in luminosity at the back than at the front in the depth of the virtual three-dimensional space. As for the image at the position of the viewpoint in this three-dimensional image, luminosity=0 with R×0, G×0, and B×0, at α=0, and thus the image will not remain as data of a visual image in the accumulation buffer 15 after the data have been updated.

Subsequently, the CPU 11 subtracts the image data of the frame buffer 16 from the image data of the accumulation buffer 15 storing updated data (refer to (3) of FIG. 2(b)). By this subtraction processing, the luminosity of an original image for screen display of the accumulation buffer 15 is reduced. In the value of reduced luminosity of the original image, the luminosity in an image located at the back is greater than that at the front in the depth of the virtual three-dimensional space. This provides, in contrast to the first three-dimensional image or the original image, a second three-dimensional image of which luminosity is set to be greater at the front than at the back in the depth of the virtual three-dimensional space.

Incidentally, the aforementioned subtraction processing can be omitted if the luminosity of the original image is greater at the front than at the back in the depth of the virtual three-dimensional space.

Then, the CPU 11 again updates the updated luminosity values showing (each of R, G, and B values in practice) the R, G, and B of each pixel of the accumulation buffer 15 to 1/N times the luminosity to acquire a third three-dimensional image (refer to (4)–(11) of FIG. 2(a)). N is a natural number representing the number of times of additions in order to add the image data stored in the accumulation buffer 15 to the original image data. This third three-dimensional image is a dummy three-dimensional image having luminosity set in accordance with the first three-dimensional image or the original image to be greater at the back than at the front in the depth of the virtual three-dimensional space.

The twice updated image data of the accumulation buffer 15 has its position shifted N times around the original image. The shifted data is added to the image data of the frame buffer 16 N times (refer to (4)–(11) of FIG. 2(b)). By this addition processing, the image with the luminosity corresponding to the value of reduced luminosity in the aforementioned subtraction processing is subjected to distributed addition to the surroundings of the original image of the frame buffer 16 with the position shifted.

Incidentally, in the explanations below, it is to be understood that a shift at the time of adding the image data of the accumulation buffer 15 to the image data of the frame buffer 16 is denoted by (i, j). Here, "i" denotes a shift expressed in the X direction from the pixel, while "j" denotes a shift expressed in the Y direction from the pixel. In FIG. 2, the vertical direction of the frame buffer 16 is the X-axis (positive in the direction from left to right), while the horizontal direction is the Y-axis (positive in the direction from up to down).

In the example of FIG. 2, the addition processing is carried out eight times. In the first addition, the position of the image data of the accumulation buffer 15 is shifted by (−1, −1) to be added to the image data of the frame buffer 16 ((4) of FIG. 2).

In the second addition, the position of the image data of the accumulation buffer 15 is shifted by (0, −1) to be added to the image data of the frame buffer 16 ((5) of FIG. 2). In the third addition, the position of the image data of the accumulation buffer 15 is shifted by (+1, −1) to be added to the image data of the frame buffer 16 ((6) of FIG. 2).

In the fourth addition, the position of the image data of the accumulation buffer 15 is shifted by (−1, 0) to be added to the image data of the frame buffer 16 ((7) of FIG. 2). In the fifth addition, the position of the image data of the accumulation buffer 15 is shifted by (+1, 0) to be added to the image data of the frame buffer 16 ((8) of FIG. 2).

In the sixth addition, the position of the image data of the accumulation buffer 15 is shifted by (−1, +1) to be added to the image data of the frame buffer 16 ((9) of FIG. 2). In the seventh addition, the position of the image data of the accumulation buffer 15 is shifted by (0, +1) to be added to the image data of the frame buffer 16 ((10) of FIG. 2). In the eighth addition, the position of the image data of the accumulation buffer 15 is shifted by (+1, +1) to be added to the image data of the frame buffer 16 ((11) of FIG. 2).

This provides, with respect to the aforementioned second three-dimensional image, a third three-dimensional image having its luminosity set to be greater at the back than at the front in the depth of the virtual three-dimensional space. Then, the second three-dimensional image is superimposed on the third three-dimensional image with a different positional relationship of the center position of the third three-dimensional image with respect to that of the second three-dimensional image.

In this case, as the example shown in FIG. 2, the luminosity of each of the shifted images is made equal to 1/8 the luminosity corresponding to the reduced value of luminosity at N=8. Each image is shifted by the pixel in eight directions around the original image and the shifted images can be distributed and added to the eight positions. In other words, the superimposition can be carried out with the positional relationship of the third three-dimensional images each shifted by the pixel in the eight directions around the second three-dimensional image. Incidentally, this embodiment employs N=8, however, N may take on any value within the range, $1 \leq n \leq 8$, as required for graduation.

Figure 3:
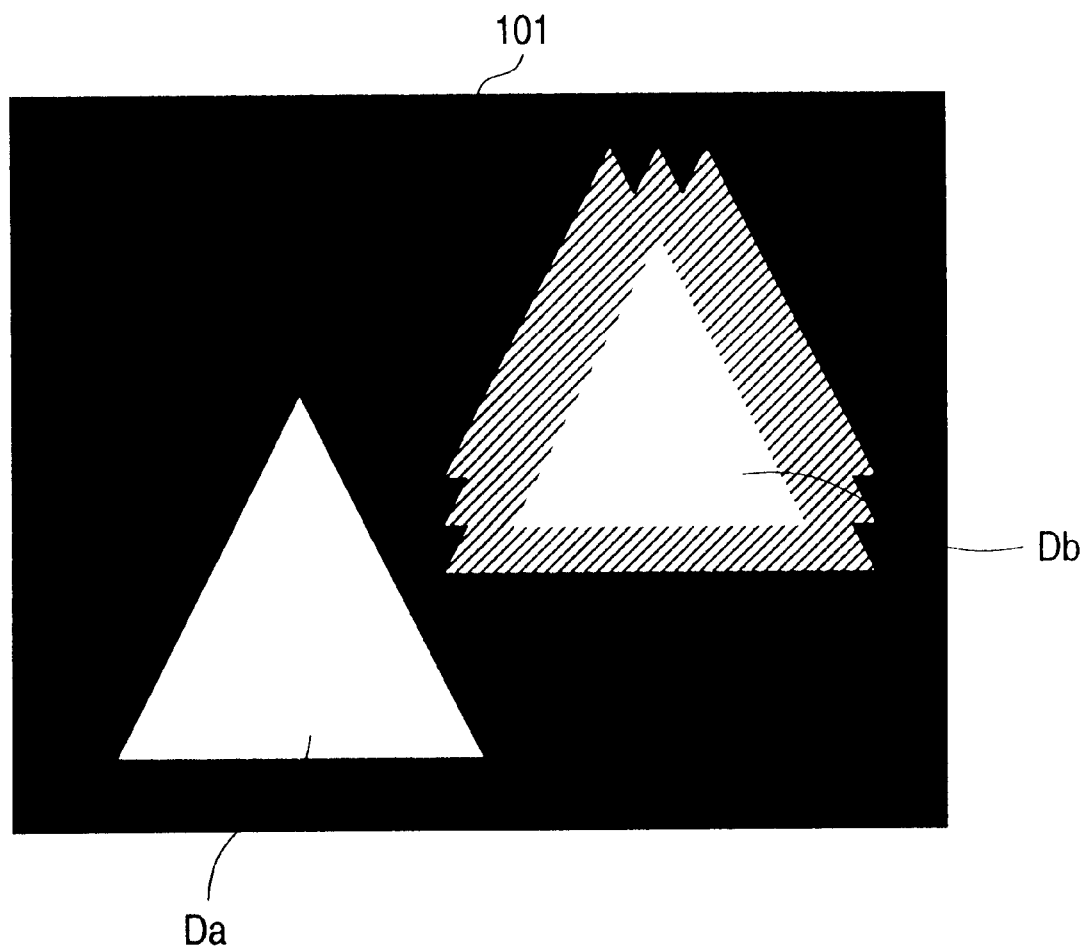
FIG. 3 is an explanatory view showing an example screen display after the graduation rendering processing, according to a first embodiment of the present invention.

A video signal is generated from the image data of the frame buffer 16, which have been subjected to the aforementioned processing, and thus screen display is carried out as illustrated in FIG. 3. On the display screen 101 of FIG. 3, two objects Da and Db are displayed. The object Da is located at the front of the object Db in the depth of the virtual three-dimensional space. Accordingly, the object Da is displayed as a focused image, while the object Db is displayed as a defocused image to which a graduation effect is given.

Next, the operation of the video game device 10 in the graduation rendering processing according to the first embodiment is explained with reference to the flow diagrams shown in FIG. 4 to FIG. 6. Incidentally, execution of a program by means of the CPU 11 of the game machine main body 10a allows the following processing to be carried out.

Figure 4:
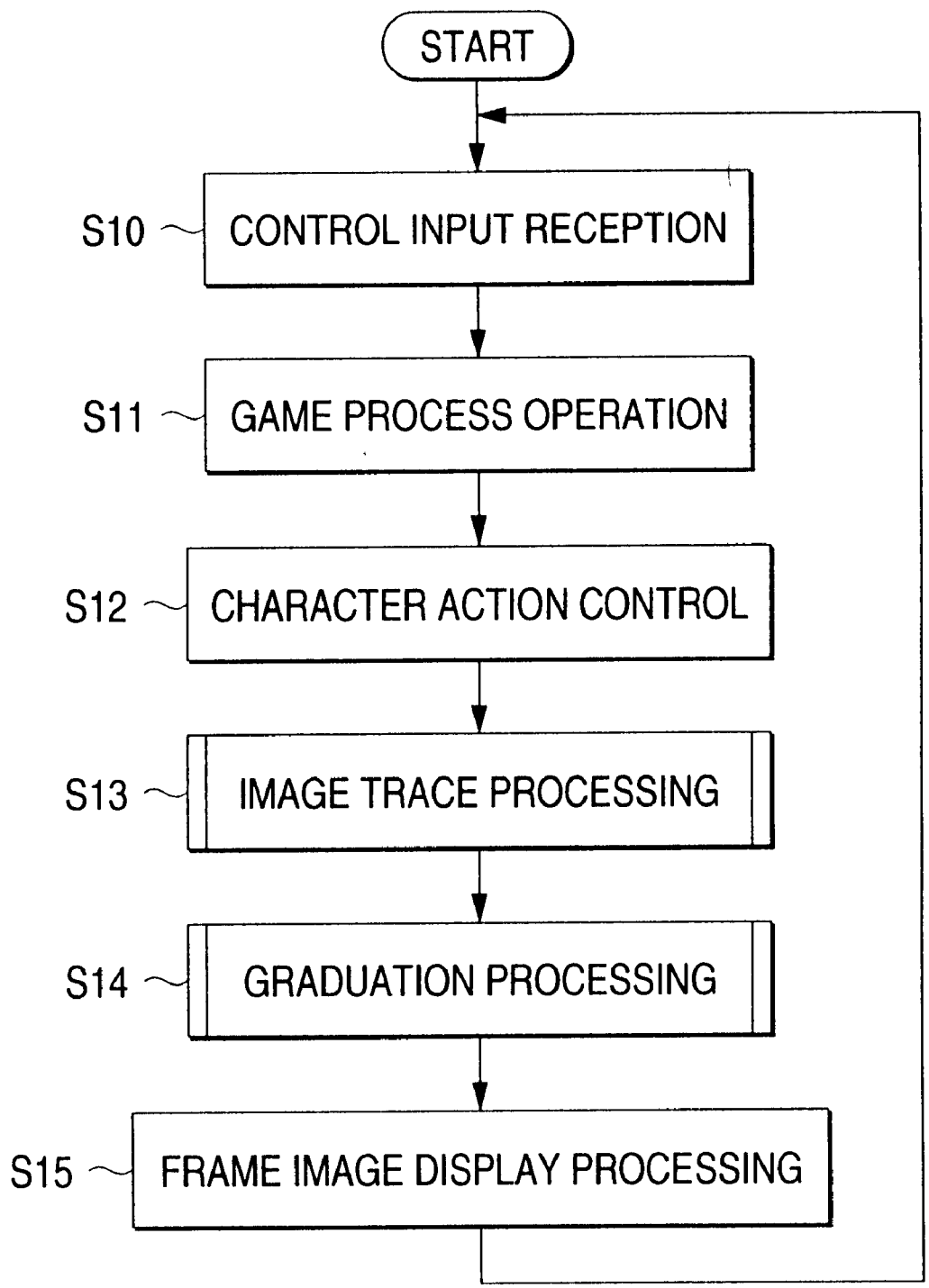
FIG. 4 is a flow diagram showing a main flow employing a video game device, a computer readable recording medium, and a graduation rendering processing method, according to an aspect of the present invention.

FIG. 4 shows a main flow. The CPU 11 receives control input from the key pad 50 (step S10) and performs a predetermined game progression operation in accordance with the game program in response to the control input (step S11). Then, the CPU 11 carries out character action control in accordance with the operation result of the game progression (step S12). Then, the CPU 11 carries out in sequence the image rendering processing (step S13), the graduation processing (step S14), and the frame image display processing (step S15).

Figure 5:
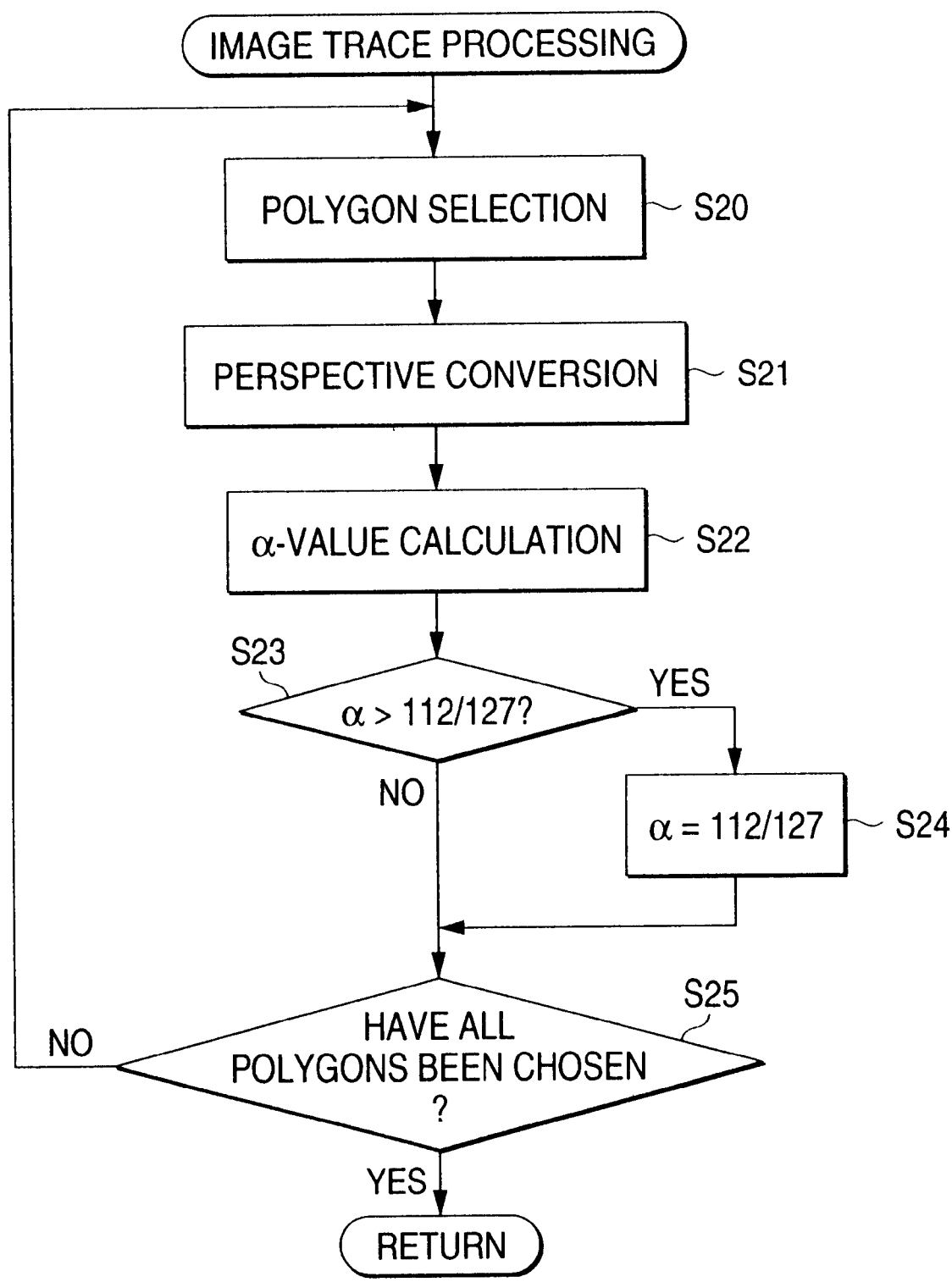
FIG. 5 is a flow diagram showing an image rendering processing flow employing a video game device, a computer readable recording medium, and a graduation rendering processing method, according to an aspect of the present invention.

FIG. 5 shows an image rendering processing flow. In the image display processing, the CPU 11 selects polygons one by one (step S20) and then allows the selected polygons to be subjected to the perspective conversion (step S21). Then, the CPU 11 calculates a value indicating the depth from the viewpoint of a polygon in accordance with the result of the perspective conversion (step S21) and accordingly assigns the α value (step S22).

If the α value is equal to 1, the image data of the accumulation buffer 15 (refer to (3) in column (a) of FIG. 2) that is obtained by multiplying the luminosity of R, G, and B by the α value is equal in luminosity to the image data copied beforehand to the frame buffer 16 (refer to (2) in column (*b*) of FIG. 2). Accordingly, in the aforementioned subtraction processing (refer to (3) of FIG. 2), an image with the α value of 1 allows the image data of the frame buffer 16 to be zero in luminosity and thus not to remain as visual image data.

In the first embodiment, in order to prevent the luminosity of the image data of the frame buffer 16 from becoming zero due to the subtraction processing, the α value is given beforehand a maximum value to which the α value is adjusted (limit value of service), which is less than 1, for example, 112/127. Accordingly, the CPU 11 determines whether the α value calculated based on the result of the perspective conversion is greater than the maximum value to which the α value is adjusted (step S23). If it is not true that the α value>the maximum value to which the α value is adjusted, the α value calculated based on the result of the perspective conversion is employed as it is. By contrast, if the α value>the maximum value to which that value is adjusted, the α value is changed to the maximum value to which the α value is adjusted (step S24). Then, the CPU 11 repeats the aforementioned processing until all the polygons have been completely selected (step S25).

Figure 6:
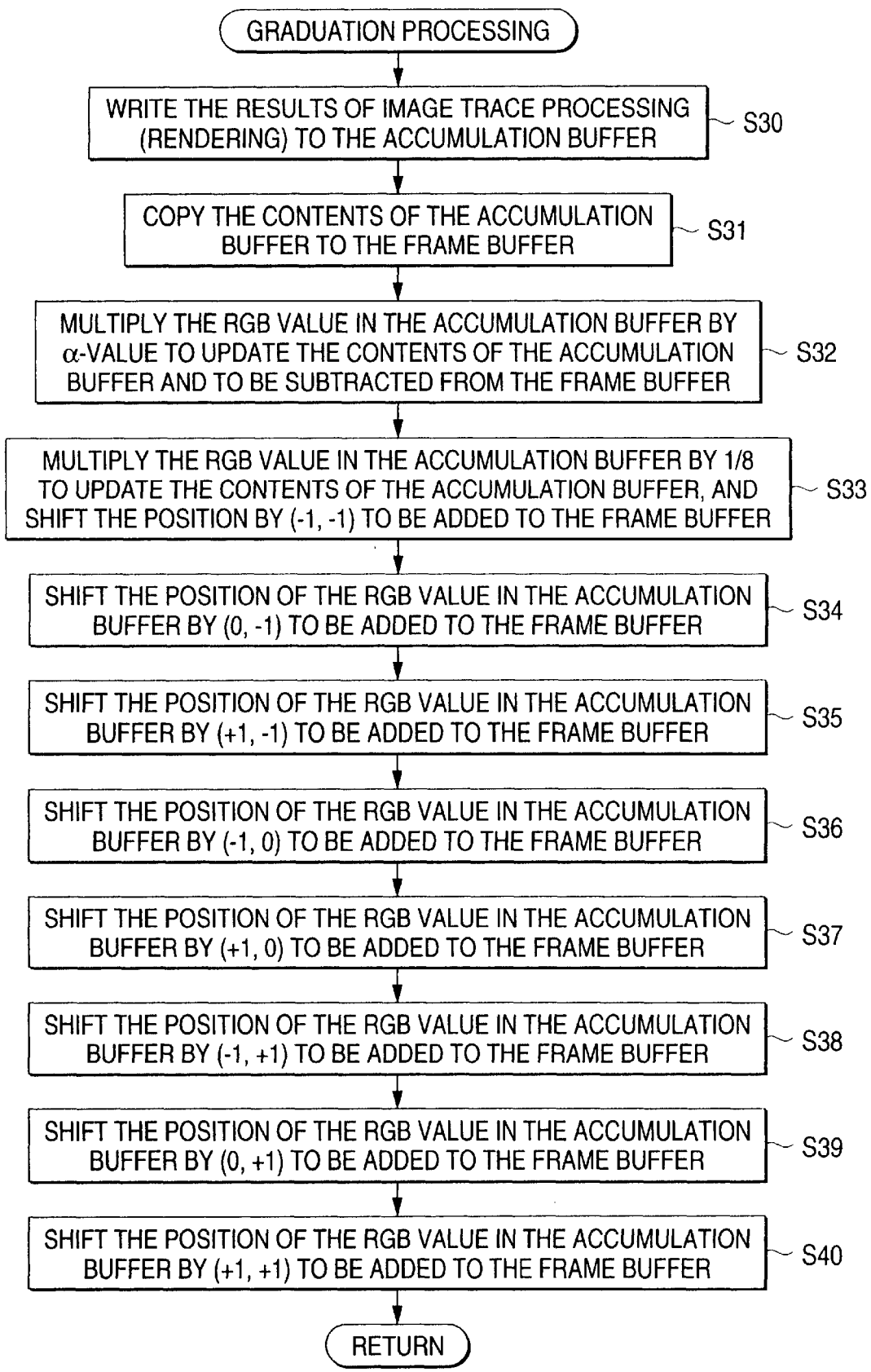
FIG. 6 is a flow diagram showing a graduation processing flow employing a video game device, a computer readable recording medium, and a graduation rendering processing method, according to a first embodiment of the present invention.

FIG. 6 shows the graduation processing flow. In the graduation processing, as the result of the image rendering processing (rendering), that is, as shown in (1) of FIG. 2, the CPU 11 writes the original image to the accumulation buffer 15 (step S30). Then, as shown in (2) of FIG. 2, the CPU 11 copies all the contents of the accumulation buffer 15 to the frame buffer 16 (step S31).

Next, the CPU 11 multiplies the R, G, and B values of each pixel of the accumulation buffer 15 by the α value and thus updates the R, G, and B values of each pixel of the accumulation buffer 15, as shown in (3) of column (a) of FIG. 2. In addition, as shown in (3) of column (b) of FIG. 2, the CPU 11 subtracts the image data of the frame buffer 16 from the updated R, G, and B values of the accumulation buffer 15 (step S32). Incidentally, needless to say, the subtraction processing and the subtraction processing to be described later are carried out for each of the R, G, and B values.

Next, the CPU 11 multiplies the updated R, G, and B values (the R, G, and B values of the original image×α) of each pixel of the accumulation buffer 15 by 1/8 as shown in (4) of column (a) of FIG. 2 in order to update again the R, G, and B values of each pixel of the accumulation buffer 15. Then, as shown in (4) of column (b) of FIG. 2, the CPU 11 shifts the updated image data of the accumulation buffer 15 by (−1, −1) with respect to the position of the original image to be added to the image data of the frame buffer 16 (step S33).

As shown in (5)–(11) of FIG. 2, the CPU 1 repeats 7 times the aforementioned addition processing by changing the position of shift with respect to the position of the original image to the positions of 8 adjacent pixels as (0, −1), (+1, −1), (−1, 0), (+1, 0), (−1, +1), (0, +1), and (+1, +1) (steps S34–S40).

That is, in step S34, the CPU 11 shifts the image data of the accumulation buffer 15 by (0, −1) with respect to the position of the original image to be added to the image data of the frame buffer 16. In step S35, the CPU 11 shifts the image data of the accumulation buffer 15 by (+1, −1) with respect to the position of the original image to be added to the image data of the frame buffer 16.

In step S36, the CPU 11 shifts the image data of the accumulation buffer 15 by (−1, 0) with respect to the position of the original image to be added to the image data of the frame buffer 16. In step S37, the CPU 11 shifts the image data of the accumulation buffer 15 by (+1, 0) with respect to the position of the original image to be added to the image data of the frame buffer 16.

In step S38, the CPU 11 shifts the image data of the accumulation buffer 15 by (−1, +1) with respect to the position of the original image to be added to the image data of the frame buffer 16. In step S39, the CPU 11 shifts the image data of the accumulation buffer 15 by (0, +1) with respect to the position of the original image to be added to the image data of the frame buffer 16. In step S40, the CPU 11 shifts the image data of the accumulation buffer 15 by (+1, +1) with respect to the position of the original image to be added to the image data of the frame buffer 16.

The execution of frame image display processing by means of a video signal of the image data of the frame buffer 16, which has been subjected to the aforementioned processing can provide the screen display shown in FIG. 3.

FIG. 7(a) shows an example of arrangement of objects X, Y in the virtual three-dimensional space. In this case, in terms of the distance when viewed from the viewpoint in the direction of the visual axis, the object Y is located farther away from the object X (at the farther back in the virtual three-dimensional space). FIG. 7(b) shows the display screen 101 of the virtual three-dimensional space. The object X is indicated by a display image Dx, while the object y is indicated by a display image Dy. As shown in the detailed view of FIG. 7(c), the display image Dx is obtained as a focused high-contrast image, whereas the display image Dy is a defocused or "out-of-focus" image that is given a graduation effect as shown in the detailed view of FIG. 7(d).

Figure 8:
FIG. 8 is an explanatory view showing an example of the display screen of a video game.

FIG. 8 shows an example of a display screen shown during a video game. On the display screen 101 shown in FIG. 8, displayed is a scene of two characters dancing. The characters are displayed in front of the background when viewed from the viewpoint. Accordingly, the images of the characters can be seen more clearly than the background. On the other hand, the background is displayed behind the characters when viewed from the viewpoint. Accordingly, the image of the background can be seen less clearly than the characters.

Figure 9:
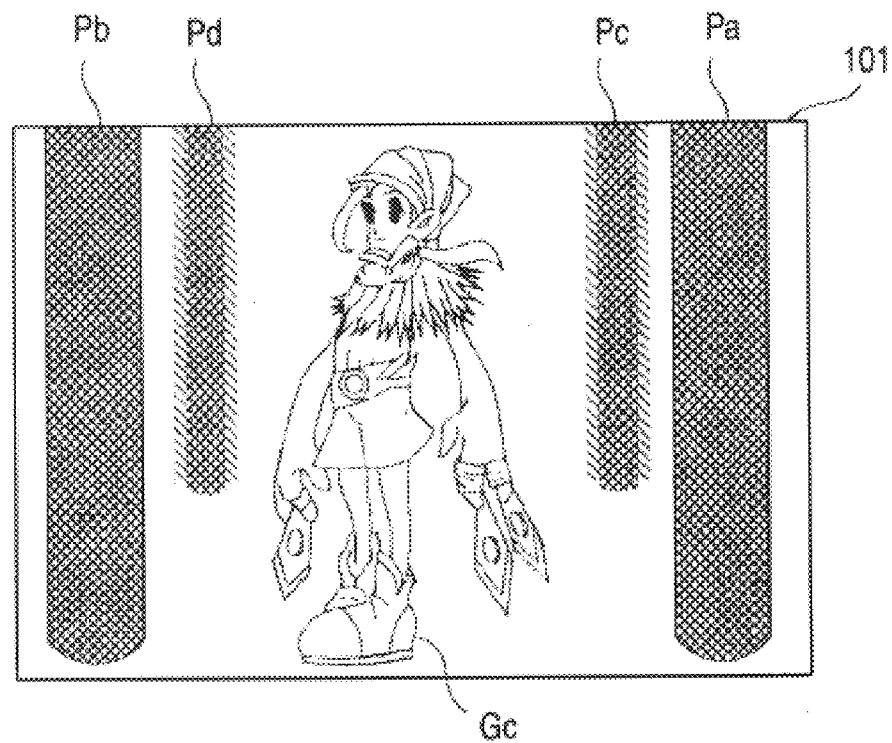
FIG. 9 is a schematic view showing an example of the display screen of a video game.

FIG. 9 shows schematically an example of the display screen 101 shows during a video game. In the example of FIG. 9, displayed are a human-shaped character Gc of the game and four pillars Pa, Pb, Pc, Pd, which appear as the background image. Of the four pillars Pa, Pb, Pc, Pd, in terms of the distance when viewed from the viewpoint in the direction of the visual axis, the two pillars Pa, Pb are located substantially at the same position of the characters Gc. In addition, in terms of the distance when viewed from the viewpoint in the direction of the visual axis, the other two pillars Pc, Pd are located further away (at the further back in the virtual three-dimensional space) from the characters Gc and pillars Pa, Pb. Accordingly, the characters Gc and the pillars Pa, Pb are focused images, whereas the pillars Pc, Pd are out-of-focus images that are given a graduation effect.

As described above, the first embodiment allows for carrying out the graduation rendering processing pixel by pixel according to the depth of each pixel of the images generated by the rendering processing. In addition, since this is implemented by a simple superimposition processing of images, no complicated operation processing is required to obtain effective defocused (out-of-focus) graduation images of multi levels of halftone. That is, simple image processing according to the depth of the virtual three-dimensional space suffices. Consequently, realistic screen display of the virtual three-dimensional space can be performed according to the depth of field.

[Second Embodiment]

Now, a second embodiment is explained. The difference between the second embodiment and the first embodiment is the presence of the update of the image data of the accumulation buffer 15. That is, in the graduation rendering processing method according to the first embodiment, the image data of the accumulation buffer 15 is updated by the image data of which luminosity has been adjusted to superimpose the updated image data on the image of the frame buffer 16.

On the other hand, in the second embodiment, the image written in the accumulation buffer 15 is superimposed on the pixels of the frame buffer 16 while the image is being subjected to luminosity adjustment processing pixel by pixel, thereby implementing the graduation rendering processing according to the depth. Incidentally, the configuration of the hard ware for implementing the second embodiment is the same as that of the first embodiment shown in FIG. 1.

FIGS. 10(a)–10(c) and FIGS. 11(a)–(c) show schematically the procedure for the graduation rendering processing according to the second embodiment. (1)–(11) of column (a) of FIG. 10 and FIG. 11 (i.e., FIGS. 10(a) and 11(a)) show schematically the transition of image data of the accumulation buffer 15. As can also be seen from FIG. 10 and FIG. 11, in the second embodiment, the image data written once in the accumulation buffer 15 will not be updated until the graduation rendering processing is completed.

(3)–(11) of column (b) of FIG. 10 and FIG. 11 (i.e., FIGS. 10(b) and 11(b)) show schematically intermittent image data 15a that can be obtained by adjusting the luminosity of the accumulation buffer 15 (such as the multiplication of the α value). (1)–(11) of column (c) of FIG. 10 and FIG. 11 (i.e., FIGS. 10(c) and 11(c)) show schematically the transition of the image data of the frame buffer 16.

Incidentally, in the second embodiment, the luminosity of each pixel of the original image of the accumulation buffer 15 is adjusted pixel by pixel. Then, every time the luminosity of the pixel is adjusted, the subtraction processing or the addition processing is carried out for the pixel in the frame buffer 16, which is to be processed, in accordance with the adjusted luminosity.

The CPU 11 allows objects in the virtual three-dimensional space to be subjected to the perspective conversion and renders the image data obtained by the perspective conversion on the accumulation buffer 15 (refer to (1) of column (a) of FIG. 10). Then, the CPU 11 copies the image data of the accumulation buffer 15 to the frame buffer 16 (refer to (2) of FIG. 10).

The CPU 11 multiplies the luminosity (each of R, G, and B values in practice) shown by the R, G, and B values of each pixel of the accumulation buffer 15 show by the α value of the pixel. This provides intermittent image data 15a of which luminosity is adjusted to be less in images located at the front than at the back (refer to column (3) in column (b) of FIG. 10). The CPU 11 subtracts the value of the luminosity of each pixel of the generated intermittent image data 15a from the luminosity of each pixel of the image data of the frame buffer 16 (refer to (3) FIG. 10). This allows the images of the frame buffer 16 to become three-dimensional images, each pixel of which is reduced in luminosity to be greater at the back than at the front (refer to (3) of column (c) of FIG. 10).

By this subtraction processing, the luminosity of an original image for screen display of the accumulation buffer 15 is reduced. In the value of reduced luminosity of the original image, the luminosity in an image located at the back is greater than that at the front in the depth of the virtual three-dimensional space.

Then, the CPU 11 multiplies the luminosity (each of R, G, and B values in practice) shown by the R, G, and B values of each pixel of the accumulation buffer 15 show by α/N (refer to (4)–(11) of column (a) of FIG. 11).

The CPU 11 adds the intermittent image data 15a (a dummy image) generated by the multiplication, having its position shifted N times around the original image, to the image data of the frame buffer 16 (refer to (4)–(11) of column (b) of FIG. 10 and FIG. 11). By this addition processing, the image with the luminosity corresponding to the value of reduced luminosity in the aforementioned subtraction processing is subjected to distributed addition to the surroundings of the original image of the frame buffer 16 with the position shifted.

In the example of FIG. 10 and FIG. 11, the addition processing is carried out eight times. Accordingly, in (4)–(11) of column (b) of FIG. 10 and FIG. 11, each of the R, G, and B values of each pixel of the accumulation buffer 15 is multiplied by α/8 ($0 \leq \alpha 112/127$), thereby generating the intermittent image data 15a having adjusted luminosity. The intermittent image data 15a having adjusted luminosity is a third three-dimensional image (a dummy image) having luminosity set to be greater at the back than at the front in the depth of the virtual three-dimensional space.

In the first addition, the position of the intermittent image data 15a, which is obtained by multiplying the luminosity of each pixel of the image data of the accumulation buffer 15 by α/8, is shifted by (−1, −1) and then the intermittent image data 15a is added to the image data of the frame buffer 16 ((4) of FIG. 10). Incidentally, (−1, −1) denotes shifts in the X and Y directions by the pixel. In the drawing, the vertical axis of the frame buffer 16 is X-axis (positive when directed from left to right), while the horizontal axis is Y-axis (positive when directed from up to down).

In the second addition, the position of the intermittent image data 15a, which is obtained by multiplying the luminosity of each pixel of the image data of the accumulation buffer 15 by a/8, is shifted by (0, −1) and then the intermittent image data 15a is added to the image data of the frame buffer 16 ((5) of FIG. 10). In the third addition, the position of the intermittent image data 15a, which is obtained by multiplying the luminosity of each pixel of the image data of the accumulation buffer 15 by α/8, is shifted by (+1, −1) and then the intermittent image data 15a is added to the image data of the frame buffer 16 ((6) of FIG. 10).

In the fourth addition, the position of the intermittent image data 15a, which is obtained by multiplying the luminosity of each pixel of the image data of the accumulation buffer 15 by α/8, is shifted by (−1, 0) and then the intermittent image data 15a is added to the image data of the frame buffer 16 ((7) of FIG. 11). In the fifth addition, the position of the intermittent image data 15a, which is obtained by multiplying the luminosity of each pixel of the image data of the accumulation buffer 15 by a/8, is shifted by (+1, 0) and then the intermittent image data 15a is added to the image data of the frame buffer 16 ((8) of FIG. 11).

In the sixth addition, the position of the intermittent image data 15a, which is obtained by multiplying the luminosity of each pixel of the image data of the accumulation buffer 15 by a/8, is shifted by (−1, +1) and then the intermittent image data 15a is added to the image data of the frame buffer 16 ((9) of FIG. 11). In the seventh addition, the position of the intermittent image data 15a, which is obtained by multiplying the luminosity of each pixel of the image data of the accumulation buffer 15 by a/8, is shifted by (0, +1) and then the intermittent image data 15a is added to the image data of the frame buffer 16 ((10) of FIG. 11). In the eighth addition, the position of the intermittent image data 15a, which is obtained by multiplying the luminosity of each pixel of the image data of the accumulation buffer 15 by α/8, is shifted by (+1, +1) and then the intermittent image data 15a is added to the image data of the frame buffer 16 ((11) of FIG. 11).

This provides, with respect to the aforementioned second three-dimensional image, a third three-dimensional image of which luminosity is so set as to be greater at the back than at the front in the depth of the virtual three-dimensional space. Then, the second three-dimensional image is superimposed on the third three-dimensional image with a different positional relationship of the center position of the third three-dimensional image with respect to that of the second three-dimensional image.

Next, the processing procedure in a game device according to the second embodiment is explained. Incidentally, the processing procedure of the graduation rendering processing method according to the second embodiment is the same as that of the first embodiment except the graduation processing flow.

That is, in the main flow, like the flow chart shown in FIG. 4, first, the CPU 11 receives control input from the key pad 50 (step S10). Then, the CPU 11 performs a predetermined game progression operation in accordance with the game program in response to the control input (step S11). Then, the CPU 11 carries out character action control in accordance with the operation result of the game progression (step S12). Then, the CPU 11 carries out in sequence the image rendering processing (step S13), the graduation processing (step S14), and the frame image display processing (step S15).

Furthermore, the image rendering processing flow in the graduation processing method according to the second embodiment is the same as the flow chart shown in FIG. 5. That is, when the image rendering processing is started, the CPU 11 selects a polygon that has not been selected (step S20). Then, the CPU 11 allows the selected polygon to be subjected to the perspective conversion (step S21) and calculates the α value of the polygon (step S22). Then, it is determined whether the calculated a value is greater than the limit value of service (112/127) (step S23). If the α value>the limit value of service, the α value is set to the limit value of service (112/127) (step S24). Then, the CPU 11 repeats the processing of steps S20–S24 until all the polygons will have been selected (step S25).

FIG. 12 shows the graduation processing flow according to the second embodiment. In the graduation processing according to the second embodiment, as shown in (1) of column (a) of FIG. 10, the CPU 11 writes the three-dimensional image that is obtained as the result of the image rendering processing (rendering), that is, the original image to the accumulation buffer 15 (step S50). At this time, the a value of each pixel of the original image is written to the accumulation buffer 15. Then, as shown in (2) of FIG. 10, the CPU 11 copies all the contents of the accumulation buffer 15 to the frame buffer 16 (step S51).

Next, the CPU 11 multiplies the R, G, and B values of each pixel of the accumulation buffer 15 by the α value and then generates intermittent image data 15a shown in (3) of column (b) of FIG. 10. Then, the CPU 11 subtracts the luminosity of each pixel of the intermittent image data 15a from the image data of the frame buffer 16 (step S52). Incidentally, the subtraction processing is carried out for each of the R, G, and B values.

Next, the CPU 11 multiplies the R, G, and B of each pixel of the accumulation buffer by $\alpha/8$ ($0 \leq \alpha 112/127$) to generate the intermittent image data 15*a* shown in (4) of column (b) of FIG. 10. Then, the CPU 11 shifts the intermittent image data 15*a* by (−1, −1) with respect to the position of the original image to be added to the image data of the frame buffer 16 (step S53).

As shown in (5)–(6) of FIG. 10 and (7)–(11) of FIG. 11, the CPU 11 repeats seven times the aforementioned addition processing by changing the position of shift with respect to the position of the original image to the positions of 8 adjacent pixels as (0, −1), (+1, −1), (−1, 0), (+1, 0), (−1, +1), (0, +1), and (+1, +1) (steps S54–S60).

That is, in step S54, the CPU 11 multiplies each pixel of the image data of the accumulation buffer 15 by $\alpha/8$ to generate the intermittent image data 15*a* shown in (5) of column (b) of FIG. 10. Moreover, the CPU 11 shifts the intermittent image data 15*a* by (0, −1) with respect to the position of the original image to be added to the image data of the frame buffer 16 (refer to (5) of column (c) of FIG. 10).

In step S55, the CPU 11 multiplies each pixel of the image data of the accumulation buffer 15 by $\alpha/8$ to generate the intermittent image data 15*a* shown in (6) of column (b) of FIG. 10. Moreover, the CPU 11 shifts the intermittent image data 15*a* by (+1, −1) with respect to the position of the original image to be added to the image data of the frame buffer 16 (refer to (6) of column (c) of FIG. 10).

In step S56, the CPU 11 multiplies each pixel of the image data of the accumulation buffer 15 by $\alpha/8$ to generate the intermittent image data 15*a* shown in (7) of column (b) of FIG. 11. Moreover, the CPU 11 shifts the intermittent image data 15*a* by (−1, 0) with respect to the position of the original image to be added to the image data of the frame buffer 16 (refer to (7) of column (c) of FIG. 11).

In step S57, the CPU 11 multiplies each pixel of the image data of the accumulation buffer 15 by $\alpha/8$ to generate the intermittent image data 15*a* shown in (8) of column (b) of FIG. 11. Moreover, the CPU 11 shifts the intermittent image data 15*a* by (+1, 0) with respect to the position of the original image to be added to the image data of the frame buffer 16 (refer to (8) of column (c) of FIG. 11).

In step S58, the CPU 11 multiplies each pixel of the image data of the accumulation buffer 15 by $\alpha/8$ to generate the intermittent image data 15*a* shown in (9) of column (b) of FIG. 11. Moreover, the CPU 11 shifts the intermittent image data 15*a* by (−1, +1) with respect to the position of the original image to be added to the image data of the frame buffer 16 (refer to (9) of column (c) of FIG. 11).

In step S59, the CPU 11 multiplies each pixel of the image data of the accumulation buffer 15 by $\alpha/8$ to generate the intermittent image data 15*a* shown in (10) of column (b) of FIG. 11. Moreover, the CPU 11 shifts the intermittent image data 15*a* by (0, +1) with respect to the position of the original image to be added to the image data of the frame buffer 16 (refer to (10) of column (c) of FIG. 11).

In step S60, the CPU 11 multiplies each pixel of the image data of the accumulation buffer 15 by $\alpha/8$ to generate the intermittent image data 15*a* shown in (11) of column (b) of FIG. 11. Moreover, the CPU 11 shifts the intermittent image data 15*a* by (+1, +1) with respect to the position of the original image to be added to the image data of the frame buffer 16 (refer to (11) of column (c) of FIG. 11).

As described above, in the second embodiment, the intermittent image data 15*a* is obtained by adjusting the luminosity of each pixel of the accumulation buffer 15 and this intermittent image data 15*a* is superimposed on the image of the frame buffer 16. This allows for obtaining the same defocused images as those of the first embodiment according to the depth of the virtual three-dimensional space without rewriting processing of the image data written in the accumulation buffer 15.

The defocused images obtained in the second embodiment are the same as those obtained in the first embodiment. That is, displaying a scene of a video game on the screen by means of the graduation rendering processing method shown in the second embodiment makes it possible to display the same defocused images as those of the example of the display screen shown in FIG. 8 and FIG. 9.

Furthermore, the graduation rendering processing obviates the need for the processing to update the contents of the accumulation buffer 15. Thus, this allows for reducing the number of times of the processing of writing image data, compared with the graduation rendering processing according to the first embodiment.

Incidentally, in the first and second embodiments of the present invention, the superposition of one image on the other was carried out by shifting an image in eight directions by one pixel, however, the shift may not be by one pixel. For example, the amount of the shift may be varied according to the size of the image data (the number of pixels in the horizontal and vertical directions).

Furthermore, the graduation rendering processing that has been explained in the aforementioned first and second embodiments of the present invention can be realized by executing a program, which has been prepared beforehand, for the graduation rendering processing on a personal computer, a video game device, or the like. The program for the graduation rendering processing is recorded on a computer readable recording medium such as a hard disk, a floppy disk, a CD-ROM, a MO (Magnetic Optical Disk), or a DVD, and is executed by being read from the recording medium by the computer. Moreover, the program for the graduation rendering processing, which is recorded on the aforementioned recording media can be distributed to other computers via networks such as the Internet.

As can be understood from the above explanations, according to the computer readable recording medium and the graduation rendering processing of the present invention, the third three-dimensional image of which luminosity is so set as to be greater at the back than at the front is superimposed on the second three-dimensional image of which luminosity is so set in the original image as to be greater at the front than at the back in the depth of the virtual three-dimensional space, with the centers thereof shifted from each other. This provides an effective defocused image according to the depth of the virtual three-dimensional space.

Furthermore, according to another invention relating to the computer readable recording medium and the graduation rendering processing, the luminosity of the original image is reduced in the depth of the virtual three-dimensional space by a greater luminosity at the back than at the front and then a graduation effect is obtained by carrying out the addition processing in which images having a luminosity corresponding to the reduced value of luminosity in the subtraction processing are distributed and added to around the original image of the frame buffer with the centers of the images shifted with respect to the original image. Accordingly, an effective defocused (out-of-focus) image of multi-levels of halftone can be obtained according to the depth of the virtual three-dimensional space through simple image processing without requiring complicated operation processing.

Furthermore, the video game device of the present invention has a frame buffer for screen display and carries out the subtraction processing for reducing the luminosity of the original image of the frame buffer by a greater luminosity at the back than at the front in the depth of the virtual three-dimensional space. The device also carries out the addition processing in which images having a luminosity corresponding to the reduced value of luminosity in the subtraction processing are distributed and added to around the original image of the frame buffer with the centers of the images shifted with respect to the original image. Then, the device carries out the rendering processing for displaying on the screen the images of the frame buffer, which have been subjected to the subtraction processing and the addition processing. Accordingly, an effective defocused (out-of-focus) image of multi-levels of halftone can be obtained according to the depth of the virtual three-dimensional space through simple image processing without requiring complicated operation processing.

The present disclosure relates to subject matter contained in priority Japanese Patent Application Nos. 11-377234, filed on Dec. 31, 1999, and 2000/050092, filed on Feb. 25, 2000, the contents of which are herein expressly incorporated by reference in their entireties.

What is claimed is:

1. A computer readable recording medium storing programs for allowing a computer to:
    set luminosity to a first three-dimensional image, which is an original image, to be greater frontward in a depth of a virtual three-dimensional space;
    acquire a second three-dimensional image based on the first three-dimensional image that has the set luminosity;
    reset luminosity of the first three-dimensional image to be greater backward in the depth of the virtual three-dimensional space;
    acquire a third three-dimensional image based on the first three-dimensional image with a luminosity that has the reset luminosity;
    superimpose the second three-dimensional image on the third three-dimensional image with a positional relationship in which a center position of the third three-dimensional image, which has the reset luminosity, is different from a center position of the second three-dimensional image, and
    display the superimposed three-dimensional image.

2. The computer program according to claim 1, wherein the superimposing further comprises superimposing the second three-dimensional image on the third three-dimensional image with a positional relationship in which the third three-dimensional image is shifted by a pixel unit with respect to the second three-dimensional image.

3. The computer program according to claim 1, wherein the third three-dimensional image comprises a plurality of 3-D images and the superimposing further comprises superimposing the second three-dimensional image on the third three-dimensional images with a positional relationship in which each of the third three-dimensional images is shifted by a pixel unit in n directions around the second three-dimensional image, where n is a natural number.

4. A computer readable recording medium storing programs for allowing a computer to:
    set luminosity of a first three-dimensional image, which is an original image, to be greater backward in a depth of a virtual three-dimensional space;
    acquire a dummy three-dimensional image based on the first three-dimensional image, which has the set luminosity;
    superimpose the first three-dimensional image on the dummy three-dimensional image with a positional relationship in which a center position of the dummy three-dimensional image, having the set luminosity, is different from a center position of the first three-dimensional image; and
    display the superimposed three-dimensional image.

5. A computer readable recording medium storing a three-dimensional computer image processing program for displaying an image on a virtual three-dimensional space of a monitor screen, the program allowing a computer to:
    execute subtraction processing to reduce the luminosity of an original image of a frame buffer by a larger luminosity for an image located rearward in a depth of the virtual three-dimensional space;
    execute addition processing to distribute and add an image having a luminosity corresponding to the reduced luminosity value in the substraction processing around the original image of the frame buffer, with a position of the image shifted with respect to the original image; and
    display the image, which has been subjected to the subtraction processing and to the addition processing, of the frame buffer on the screen.

6. The computer program according to claim 5, wherein the addition processing further comprises displaying the image by a pixel unit in n directions, to be distributed and added at n positions around the original image, where n is a natural number; and
    wherein each displaced image being provided with a 1/n luminosity corresponding to the reduced value of luminosity.

7. The computer program according to claim 1, wherein the depth of the virtual three-dimensional space is a distance in the direction of a visual axis between an imaginary plane, passing through a viewpoint and perpendicular to the visual axis, and the first three-dimensional image.

8. A graduation rendering processing method in three-dimensional computer image processing, comprising:
    setting luminosity of a first three-dimensional image, which is an original image, to be greater frontward in a depth of a virtual three-dimensional space;
    acquiring a second three-dimensional image based on the first three-dimensional image having the set luminosity,
    resetting luminosity of the first three-dimensional image to be greater backward in the depth of the virtual three-dimensional space;
    acquiring a third three-dimensional image based on the first three-dimensional image having the reset luminosity,
    superimposing the second three-dimensional image on the third three-dimensional image with a positional relationship in which a center position of the third three-dimensional image, having the reset luminosity, is different from a center position of the second three-dimensional image; and
    displaying the superimposed three-dimensional image.

9. The graduation rendering processing method in three-dimensional computer image processing according to claim 8, wherein the superimposing further comprises superimposing the second three-dimensional image on the third three-dimensional image with a positional relationship in which the third three-dimensional image is shifted by a pixel unit with respect to the second three-dimensional image.

10. The graduation rendering processing method in three-dimensional computer image processing according to claim 8, wherein the third 3-D images further comprise a plurality of 3-D images and the superimposing further comprises superimposing the second three-dimensional image on the third three-dimensional images with a positional relationship in which each third three-dimensional images is shifted by a pixel unit in n directions around the second three-dimensional image, where n is a natural number.

11. A graduation rendering processing method in three-dimensional computer image processing, comprising:

setting luminosity of a first three-dimensional image, which is an original image, to be greater backward in a depth of a virtual three-dimensional space;

acquiring a dummy three-dimensional image based on the first three-dimensional image, having the set luminosity;

superimposing the first three-dimensional image on the dummy three-dimensional image with a positional relationship in which a center position of the dummy three-dimensional image, having the luminosity, is different from a center position of the first three-dimensional image, and displaying the superimposed three-dimensional image.

12. A graduation rendering processing method in three-dimensional computer image processing, comprising:

executing subtraction processing to reduce a luminosity of an original image of a frame buffer by a larger luminosity of an image located rearward in a depth of the virtual three-dimensional space, executing addition processing to distribute and add an image having a luminosity corresponding to a reduced value of luminosity in the subtraction processing around the original image of the frame buffer, with a position of the image shifted with respect to the original image; and displaying the image, which has been subjected to the subtraction processing and the addition processing, of the frame buffer on the screen.

13. The graduation rendering processing method in three-dimensional computer image processing according to claim 12, wherein the addition processing further comprises displacing the image by a pixel unit in n directions to be distributed and added at n positions around the original image, where n is a natural number; and providing each displaced images with a 1/n luminosity corresponding to the reduced value of luminosity.

14. The graduation rendering processing method in three-dimensional computer image processing according to claim 8, wherein the depth of the virtual three-dimensional space is a distance in the direction of a visual axis between an imaginary plane, passing through a viewpoint and perpendicular to the visual axis, and the first three-dimensional image.

15. A video game device for displaying backgrounds or game character images in a virtual three-dimensional space of a monitor screen comprising:

a frame buffer for screen display;

a subtraction processor that reduces a luminosity of an original image of the frame buffer for screen display by a larger luminosity of an image located rearward in a depth of the virtual three-dimensional space;

an addition processor that distributes and adds an image, having a luminosity corresponding to the reduced luminosity value in the subtraction processing, around the original image of the frame buffer, with a position of the image shifted with respect to the original image; and a display that displays the image, which has been subjected to the subtraction processing and the addition processing, of the frame buffer on the screen.

16. A video game device for displaying backgrounds or game character images in a virtual three-dimensional space of a monitor screen, comprising:

an image acquiring system that sets luminosity of a first three-dimensional image, which is an original image, to be greater frontward in a depth of a virtual three-dimensional space and acquires a second three-dimensional image, having the set luminosity;

another image acquiring system that resets luminosity of the first three-dimensional image to be greater backward in the depth of the virtual three-dimensional space and acquires a third three-dimensional image based on the first three-dimensional image, having the reset luminosity;

a superimposing system that superimposes the second three-dimensional image on the third three-dimensional image with a positional relationship in which a center position of the third three-dimensional image, having the reset luminosity, is different from a center position of the second three-dimensional image; and a display that displays the superimposed three-dimensional image.

* * * * *

UNITED STATES PATENT AND TRADEMARK OFFICE
CERTIFICATE OF CORRECTION

PATENT NO.    : 6,593,922 B1
DATED         : July 15, 2003
INVENTOR(S)   : T. Shimono It is certified that error appears in the above-identified patent and that said Letters Patent is hereby corrected as shown below:

Title page,
Item [56], References Cited, FOREIGN PATENT DOCUMENTS, should be included:

```
--8-16812     01/19/96    Japan
11242753      09/07/99    Japan
6-231273      08/19/94    Japan
6-259573      09/16/94    Japan
4-287177      10/12/92    Japan
11328437      11/30/99    Japan--  ; and
```

"00-093654" should be -- 2000-093654 --
OTHER DOCUMENTS, should be included:

--English Language Translation for JP Appln. No. 8-16812.
English Language Abstract for JP Appln. No. 11-242753.
English Language Abstract for JP Appln. No. 6-231273.
English Language Abstract for JP Appln. No. 6-259573.
English Language Abstract for JP Appln. No. 4-287177.
English Language Abstract for JP Appln. No.11-328437.
Open GL Architecture Review Board "Open GL Programming Guide (Japanese Version)", Addison-Wesley Publishers Japan, December 20, 1993, 1st edition, pp 311-323.
Masashi BABA et al., "Calibrated Computer Graphics (Fast Image Creation for Calibrated Computer Graphics)", Study Report of Information Processing Society of Japan, November 19, 1998, vol. 98, no. 103, pages 49-56.--

Signed and Sealed this

First Day of June, 2004

JON W. DUDAS
*Acting Director of the United States Patent and Trademark Office*